Sept. 26, 1944.  P. W. ROHRBAUGH  2,358,881
DEVICE FOR DETERMINING THE EPINASTY RESPONSE OF PLANTS
Filed Feb. 24, 1942  2 Sheets-Sheet 2

INVENTOR
Percy W. Rohrbaugh
per Robert E. Harris
Attorney

Patented Sept. 26, 1944

2,358,881

UNITED STATES PATENT OFFICE 2,358,881

DEVICE FOR DETERMINING THE EPINASTY RESPONSE OF PLANTS

Percy W. Rohrbaugh, Upland, Calif., assignor to California Fruit Growers Exchange, Los Angeles, Calif., a corporation of California Application February 24, 1942, Serial No. 432,103

7 Claims. (Cl. 73—432)

This invention relates to a device to be used in connection with the testing of various atmospheres for the presence of ethylene and other gases. More particularly, the invention relates to a device in which plants showing epinastic response may be grown for the purpose of testing fruit storage atmospheres for the presence or absence of ethylene.

The storage of citrus fruits, and more particularly lemons, presents a number of problems, not the least of which is the curing of the fruit in storage over comparatively long periods of time without incurring during this storage period substantial shrinkage, withering, decay, loosening of buttons, and over-coloration.

Lemons are ordinarily picked while they still have a green color but after they have reached the desired size. The green fruit is stored in storage rooms, commonly basements, for a period of from several weeks to several months, during which certain internal curing takes place which makes the juice of the fruit more readily available, and, in addition, the green colored lemons gradually change to the desired lemon-yellow color. During the curing or storage period, the respiratory action of the fruit continues, although to a lesser extent than when the fruit is on the tree. As a result of the respiration of the fruit, carbon dioxide and other gaseous end-products are given off, and some of these in turn tend to accelerate the curing of the fruit, as well as the development of the yellow color.

Also, during the storage period some lemons decay as a result of mold infection. It is now believed that a considerable amount of ethylene is given off by the decaying lemons and that at times the concentration of ethylene in the storage atmosphere becomes sufficient to promote more rapid coloring of the fruit.

In addition to the gases which accumulate in the storage atmosphere from the normal respiration of the fruit and as a result of the decaying fruit, it is believed that ethylene and other gases find their way into the lemon storage rooms from other sources. For example, in packing houses where oranges are being ethylene colored in one part of the packing house and lemons stored in another part of the same house, the ethylene-containing air finds its way into the lemon storage rooms, either from natural causes or is drawn in when the lemon storage atmosphere is reconditioned. Also, in those packing houses situated adjacent to busy highways, a considerable amount of automobile exhaust gases containing ethylene is drawn into the storage chambers with the outside air.

In order therefore to retard too rapid coloring and curing of the fruit, it is necessary periodically to refresh or recondition the fruit storage atmosphere to restore the oxygen balance and eliminate the gaseous products of respiration and decay. This is ordinarily done by forcing properly cooled and humidified air into the storage space to replace the old storage atmosphere.

Unfortunately, in the past the presence of the unwanted ethylene in the storage rooms has only been evidenced by observing the detrimental effects on the fruit, and when these have already occurred it is obviously too late to take precautionary measures to prevent or counteract them. There has, moreover, been no simple and satisfactory means for determining the presence of ethylene in the storage rooms. Gas analysis of the storage atmosphere could, of course, be undertaken, but this not only involves elaborate equipment but the employment of highly skilled technicians. It has been known for some time that petioles of leaves of many plants grow more rapidly on the upper sides in atmospheres bearing ethylene. This peculiar response of certain plants to the presence of ethylene is referred to as chemotropism or an epinastic response. Tomato plants, castor beans, potato sprouts, and pea plants, especially those which have been grown in darkness will when placed in an atmosphere containing ethylene evidence chemotropism. When pea seedlings, for example, are placed in an atmosphere containing ethylene, their growth is stunted and the growth that does continue tends to assume a horizontal direction.

Heretofore, it has not been possible to take advantage of the sensitivity of those plants showing the epinastic response for testing fruit storage atmospheres for the presence of ethylene, since there has been no device or means available for growing the plants in the atmosphere to be tested under the conditions necessary for plant growth. It is necessary, of course, that during the test the growth of the plants continue in the absence of light and, furthermore, the test plants must be maintained at temperatures proper for their continued active growth, which temperatures are considerably above the storage temperatures at which the fruit must be maintained for optimum curing and for best keeping qualities. At the same time adequate circulation of the storage atmosphere around the growing plants is necessary.

I have, therefore, invented a device by means of which plants showing epinastic response may be grown in the absence of light and in the presence of circulated air and at temperatures favorable for plant growth. Accordingly, an object of this invention is to provide and disclose means for growing plants in the absence of light and at a temperature conducive to maximum plant growth, while at the same time maintaining continuous circulation of air past the growing plant.

Another object of this invention is to provide and disclose means for using epinasty responsive plants for the determination of the presence or absence of ethylene.

These and other objects, uses, and advantages of this invention will become apparent to those skilled in the art as the description proceeds in connection with the accompanying drawings, in which.

Corresponding and like parts in the drawings are referred to in the following description and are indicated in all views by the same reference numbers.

Figure 1:
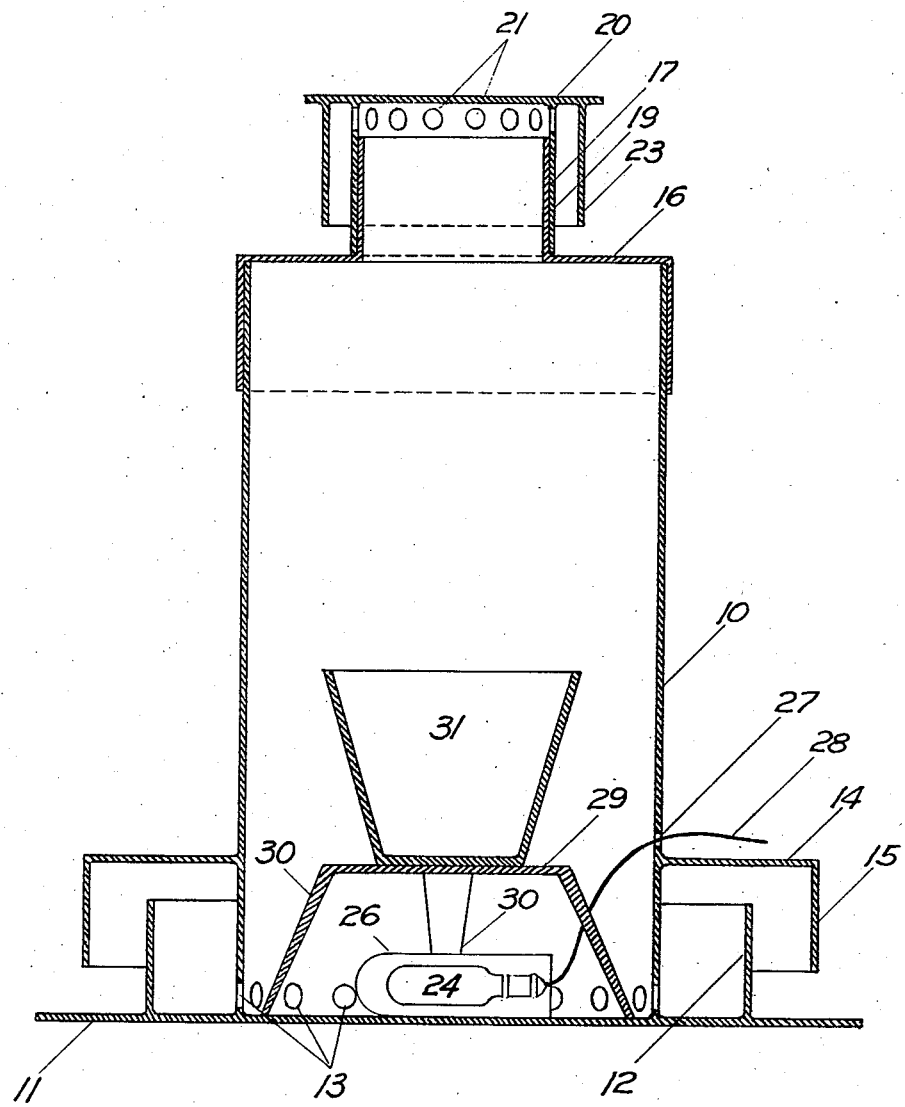
Fig. 1 is a vertical, cross-sectional view of the device.

Referring now to the drawings in detail and particularly to Fig. 1, it will be apparent that the embodiment of the invention which is illustrated comprises a cylindrical housing 10 which has attached thereto and is supported by a base plate 11. An upstanding annular baffle 12 surrounding and spaced from the cylindrical housing 10 is attached at right angles to the base plate 11. A series of air intakes 13 are formed around the periphery of the cylindrical housing 10 adjacent to the base plate 11. An annular ring 14 attached at right angles to the cylindrical housing 10 is adapted to extend out over the annular baffle 12. Depending from the ring 14 and at right angles thereto is an annular skirt 15. As is clearly shown in Fig. 1, the parts 12, 14, and 15 are constructed to form a light-maze to prevent passage of light to the interior of the cylindrical housing by means of the air intakes 13.

Figure 5:
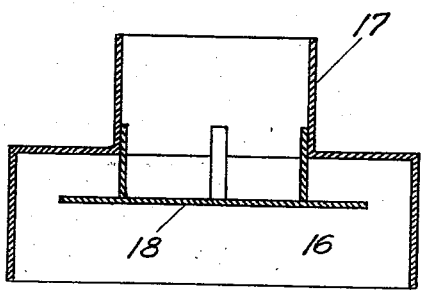
Fig. 5 is a vertical, cross-sectional view of the collar showing an additional and optional construction not shown in Fig. 1.

Fig. 5 shows more clearly the detail of the collar 16 with a neck 17. It also shows an additional construction in which a baffle plate 18 is attached below the opening of the neck 17 so as to provide further light exclusion where desired. This baffle plate is not regarded as essential for many uses and is not shown in Fig. 1. The collar is adapted to be positioned over the upper end of the cylindrical housing 10.

Figure 4:
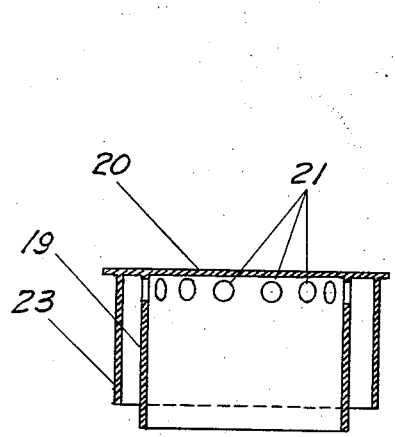
Fig. 4 is a vertical, cross-sectional view of the cap.
Figure 3:
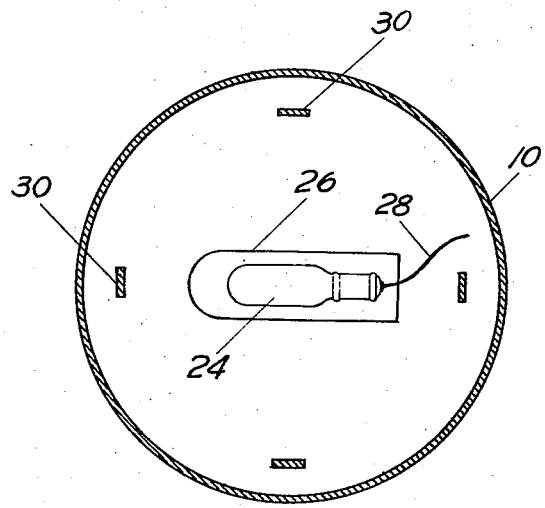
Fig. 3 is a horizontal, cross-sectional view of the device taken along the line 3—3 of Fig. 2.
Figure 2:
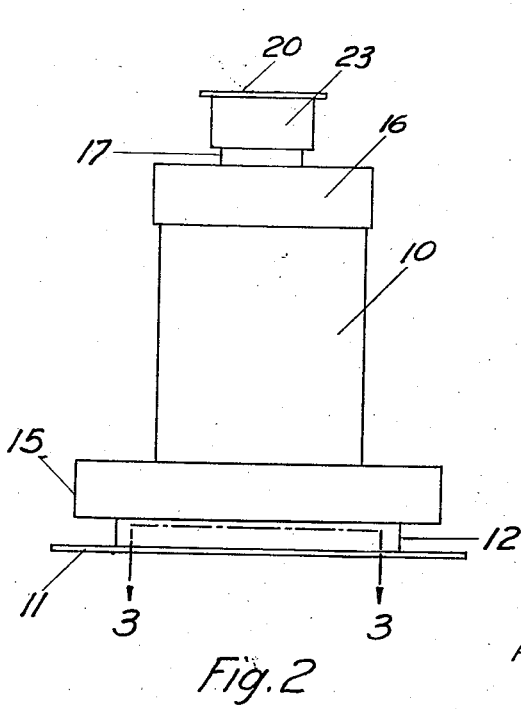
Fig. 2 is an elevation of the device.

A cap, details of which may be readily seen by referring to Fig. 4, is constructed so as to fit tightly over the neck 17 of the collar 16. The main body 19 of the cap is of greater length than the neck 17 of the collar so that the top 20 of the cap will be held above and away from the top of the neck 17, the reasons for which will become apparent hereinafter. A series of air outlets 21 is formed around the upper periphery of the main body of the cap 19. The annular skirt 23 surrounding and positioned away from the main body of the cap 19 depends from the top 20 of the cap in a manner adapted to form a light-maze for the air outlets 21. It will be seen by again referring to Fig. 1 that when the cap is in position on the device the neck 17 of the collar 16 does not close the air outlets 21.

Air may circulate into the bottom of the device by passing under the annular skirt 15 and over the annular baffle 12 into the air intakes 13, thence up through the housing and out through the air outlets 21 and past the annular skirt 23. The movement or circulation of the air in the above-described manner is promoted by a heating element 24 positioned within the housing 10. This heating element 24 ordinarily rests on the base plate 11, and may be of any desired type which will satisfactorily maintain the temperature of the contents of the device and the atmosphere passing therethrough at a temperature of about 78° F. In the drawings, I have shown the heating element 24 to be an electric light bulb, this in turn encased within a light-shield 26. Actually, in practice I have found that two 15-watt carbon element light bulbs wired in series and enclosed within collapsible metal tubes are satisfactory to maintain the temperature within the proper range for growing the test plants when the device is used in storage rooms wherein the temperature range is maintained between 55° and 58° F. Obviously in this connection the temperature of the contents of the device and the atmosphere passing therethrough may be controlled within the desired temperature range by means of a thermostat operating in conjunction with the heating element.

A small opening 27 in the side of the cylindrical housing 10 is provided to admit the electric cord 28 carrying the necessary current for the heating element. This opening will, of course, be made light-proof.

A table 29 having legs 30 is positioned within the housing and is adapted to support the container 31 within which the test plants are grown.

The device illustrated in the drawings may be made in accordance with the following description, although it is to be understood that many modifications in the type and kind of materials used in its construction may be made without departing from the general principles set forth. For example, I choose to construct the housing of the device in a cylindrical shape, since I believe this shape is advantageous in that it permits better and more uniform circulation of the air through the device than one which is of some other shape. In the following description of the construction of my device, I refer to specific dimensions, but this is done merely for the purpose of disclosing to those skilled in the art a satisfactory size. Such dimensions are important only in that they give the general relationship of the size of the various parts of the device. For use in testing the atmosphere of storage rooms, I have found that a very satisfactory device may be made in accordance with the following description.

For purposes of economy and ease of fabrication, I choose to construct my device from 20 gauge galvanized iron. Obviously, other materials could be used, but for my purpose the galvanized iron is satisfactory. The cylindrical housing 10, which is about six and one-half inches in diameter, should be from twelve to fifteen inches in height to give ample room for the test plants to grow. The base plate 11 which supports the cylindrical housing should be about thirteen inches in diameter. The annular baffle 12 surrounding the cylindrical housing 10 is usually spaced about one inch therefrom and is from about one to one and one-half inches in height. I have found that the series of air intakes 13 permits adequate circulation of air if the holes are about one-half inch in diameter and spaced around the periphery of the housing about one-half inch apart. The ring 14, which is attached at right angles to the cylindrical housing 10, should extend therefrom about two and one-half to three inches, while the skirt 15 depending from the ring should come to within about one-half to three-quarters of an inch of the base plate 11. It is pointed out at this time that the light-maze comprising the parts 12, 14 and 15 should be so related to each other so as to exclude substantially all the light which might enter through the air inlets 13 without materially impeding the circulation of the air therethrough. I have found it desirable to paint the surfaces of these parts so that reflection of light therefrom is materially reduced. It may be found desirable, when using plants exceptionally sensitive to light or in the presence of a strong external light source, to complicate the light-maze by adding additional skirts and baffles similar to those shown.

The collar 16 is constructed so as to fit snugly over the upper end of the cylindrical housing 10. I choose to make the neck 17 of the collar of such size that a standard three-inch stove pipe may be interposed between the neck 17 and the main body of the cap 19, since for certain types of work I find it desirable to increase the circulation of air through the housing by using an elongated neck or stack.

The cap is constructed so as to fit over the neck 17. The main body 19 of the cap may preferably be about two and one-half to three inches in length, care being taken that this portion of the cap is of greater length than the neck 17, which I usually make not over two inches high. The air outlets 21 formed around the upper periphery of the main body of the cap may be about one-quarter of an inch in diameter and spaced about one-half inch apart. The annular skirt 23 surrounding the main body of the cap 19 is positioned therefrom about one-half inch and depends from the top about two inches.

The table 29 may be of any convenient size to fit loosely within the cylindrical housing. I have found that a circular table of about five inches in diameter with four legs about one and one-half inches high and an inch in width, all being constructed out of galvanized iron, makes a satisfactory support for the containers in which the test plants are growing.

As mentioned before, this device is used in connection with plants showing epinastic response for the purpose of determining the presence or absence of ethylene in various atmospheres, and, particularly, those atmospheres within fruit storage chambers. If it is decided to test the atmosphere in a storage room for the presence of ethylene, a can of pea seedlings which have been germinated and grown in the dark until they are about one or two inches high, is placed on the table in the device. The device with the test plants therein is placed in a suitable location in the storage room and the heating element connected to a 110-volt electric service outlet. The test plants are permitted to continue growth in the device for a period of from two to four days. If ethylene is present in the storage atmosphere, the test plants will be stunted, grow over sideways, or both.

Under certain circumstances it may be desirable to use this device apart from or outside of storage chambers as, for example, in testing various gas concentrations adjacent to highways. In such cases a heating element probably will not be needed, if the outside temperature is not materially below the growing temperature range for the test plants.

Having thus described my invention in such clear, concise, and exact terms as to enable others skilled in the art to perform the same, I claim as my invention and desire to secure by Letters Patent the following:

1. A device useful in determining the epinasty response of plants comprising a cylindrical housing of light-impervious material supported by a base plate, said housing having a series of air intakes formed around the periphery thereof adjacent to the base plate, a baffle surrounding the housing at right angles to the base plate, said baffle extending above the tops of the aforesaid air intakes, an annular ring attached at right angles to the housing and adapted to extend out over said baffle, a skirt depending at right angles from said annular ring beyond the baffle and telescopically covering a major portion thereof and in spaced relation thereto, a collar positioned over the upper end of the housing, said collar having a neck portion adapted to support a tightly fitting cap, a cap having a main body portion, with a series of air outlets formed around the upper periphery thereof, a skirt positioned away from the main body of the cap and adapted to shield the air outlets thereof, said cap being so positioned on the neck that the air outlets are not closed thereby, and a supporting means within the housing adapted to support the test plants.

2. A device useful in determining the epinasty response of plants comprising a cylindrical housing of light-impervious material supported by a base plate, said housing having a series of air intakes formed around the periphery thereof adjacent to the base plate, a baffle surrounding the housing at right angles to the base plate, said baffle extending above the tops of the aforesaid air intakes, an annular ring attached at right angles to the housing and extending outwardly therefrom, a skirt depending from said annular ring to a point below the top of said baffle and in spaced relation thereto, a collar positioned over the upper end of the housing, said collar having a neck portion adapted to support a tightly fitting cap, and a cap, said cap having main body portion with a series of air outlets formed around the upper periphery thereof and a skirt positioned away from the main body of the cap and adapted to shield the air outlets thereof, said cap being so positioned on the neck that the air outlets are not closed thereby.

3. A device useful in determining the epinasty response of plants, comprising a housing of light-impervious material having a series of air intakes around the periphery of the bottom thereof, a light-maze surrounding the said air intakes in such a manner as to exclude light from entering into the device through the air intakes but adapted to permit the passage of air thereinto, means for covering the housing to exclude light from the inside thereof, said means having air outlets therein, means within said housing adapted to maintain the temperature of the device and the air passing therethrough within a predetermined range.

4. A device useful in determining the epinasty response of plants, comprising a housing of light-impervious material having a series of air intakes around the periphery of the bottom thereof, a light maze surrounding the said air intakes in such a manner as to exclude light from entering into the device through the air intakes, but adapted to permit the passage of air thereinto, means for covering the housing to exclude light from the inside thereof, said means having air outlets therein.

5. A device useful in determining the epinasty response of plants comprising a housing of light-impervious material having a series of air intakes around the periphery of the bottom thereof, a light maze surrounding the said air intakes in such a manner as to exclude light from entering into the device through the air intakes but adapted to permit the passage of air thereinto, means for covering the housing to exclude light from the inside thereof, said means having air outlets therein, and means for effecting a circulation of air in the housing.

6. A device useful in determining the epinasty response of plants comprising a housing of light-impervious material, said device having means to admit air adjacent the bottom thereof, light-excluding means covering said air-admitting means in such a manner as to exclude light from entering into the device through the air-admitting means but adapted to permit passage of air thereinto, air outlets adjacent the top of the said device, and light-excluding means covering said air outlets in such a manner as to exclude light from entering into the device therethrough.

7. A device useful in determining the epinasty response of plants comprising a housing of light-impervious material, said device having means to admit air adjacent the bottom thereof, light-excluding means arranged so as to prevent admission of light through said air-admitting means, air outlet means adjacent the top of the device, and light excluding means so arranged as to prevent admission of light through said air outlet means.

PERCY W. ROHRBAUGH.